UNITED STATES PATENT OFFICE.

PERRY FINLEY, OF NEW YORK, N. Y.

IMPROVEMENT IN TREATING RUBBER AND OTHER VULCANIZABLE GUMS.

Specification forming part of Letters Patent No. 116,825, dated July 11, 1871.

*To all whom it may concern:*

Be it known that I, PERRY FINLEY, of the city, county, and State of New York, have invented certain improvements in the preparation and manufacture of caoutchouc and other vulcanizable gums, and in combining the same with pyroxyline, of which the following is a specification:

The first part of my invention relates to the treatment and preparation of caoutchouc or other vulcanizable gums, combined with amber and linseed or other drying-oils, for the purpose of converting these substances into hard and inflexible or hard and flexible substances, known as hard rubber or vulcanite, or for converting the same into a japan, a lacquer, or varnish. The manner of producing this improvement consists in thoroughly mixing caoutchouc or other vulcanizable gum with amber and linseed or other drying-oil in the proportion of about from one to sixteen ounces of amber to one pound of the caoutchouc and from two twelve ounces of oil, and then subject, or not, the same to a high degree of heat, as in any of the well-known vulcanizing processes, until the compound shall have acquired a hard and tough property found in ivory, tortoise-shell, vulcanite, or the hardness of amber, or the hardness and brilliancy of the best japan, or varnish, or lacquer. I prefer to combine these substances by fusing the amber carefully over a clear, bright fire, and by frequent stirring, and when the amber is in a complete state of fusion I add the oil, heated to about the same degree of heat as the amber, and continue the amber and oil over the fire until completely blended into a smooth and homogeneous mass. I then add the caoutchouc or other vulcanizable gum, fused and heated to the same degree of heat as the amber and oil, and continue to heat over a slow fire, or with steam, until the whole is well blended. I also produce this compound by incorporating the several ingredients by thoroughly grinding or masticating between heated rollers, or in any of the well-known processes of mixing rubber compounds, first reducing the amber to an impalpable powder, or dissolving it in acid or an alkali, or otherwise, or fuse with oil, as above described. The ingredients may also be united in a dissolved state.

To further increase the hardening qualities of this substance the material may be boiled in an alkaline solution, or subjected to the action of steam in the presence of an alkaline substance for from two to ten hours.

By this improvement I produce a new substance or manufacture, very distinct in character and use from any substance before known, which unites the valuable qualities of the other rubber compounds or vulcanite with the hard, brilliant, and resistant qualities of amber, and differing from other rubber compounds in its freedom from odor and its quality to form hard, tough, and brilliant substances with or without the further application of heat, and possessing properties suitable for making, by molding or otherwise, a great variety of useful articles employed in the arts, such as are usually made from other hard rubber compounds, or ivory, tortoise-shell, or amber, or suitable for making japans, varnishes, lacquers, and paints. This substance may be used alone or combined with other gums and resins, with ground clay, bitumen, or lime, and, when the ingredients have been thoroughly incorporated, and while the compound is in a plastic state, may be rolled into sheets, or pressed into any form desired by molding or otherwise, and then subjected to a high degree of heat, which should not be less than from 240° to 320° Fahrenheit, in an oven or otherwise, and continued in the heat for from two to twelve hours, or until the compound has obtained the required degree of hardness.

For a japan or enamel I reduce this substance to about the consistency of paint or varnish, in naphtha, sulphide of carbon, or any other well-known solvent of caoutchouc, and apply with a brush or otherwise, and bake or vulcanize in an oven, or in any other way, at a heat ranging from 220° to 320° Fahrenheit, for from two to ten hours, or until the required hardness is obtained. This material I also use in a dissolved state as a varnish, or lacquer, or a paint, which will harden with or without baking or heat; or the substance, while in a plastic condition, may be applied in the usual way with a spreading-machine, which will be applicable to fabrics, paper, leather, and for water-proofing. I also apply this material, while in a fused state, by dipping or otherwise. This will be applicable to water, gas, and steam-pipes, and for many other purposes, and may be combined with ground spar, coke, or plaster of Paris, or other cheap material.

The clamminess and want of hardness in caoutchouc and other vulcanizable gums in their natural state, their susceptibility to alteration by the action of the sun, and their liability to ferment have heretofore prevented their successful employment in the production of hard and tough lacquers and varnishes. In this invention these objections have been obviated in the production of a substance that will form, with suitable solvents, a tough, hard, and brilliant lacquer or varnish, and that will unite readily with the drying-oils and with other gums and resins, and that may be thinned or dissolved with the drying-oils, or with any of the solvents of caoutchouc, without, enlarging in bulk, that especially adapts it for forming a hard and tough substance with pyroxyline.

It is well known that rubber in its natural state, in passing from a dry to a dissolved state, enlarges thirty volumes in bulk, and in consequence, when combined with pyroxyline, which must also be in a plastic or dissolved condition, will produce a substance that will shrink immensely while the solvents are being driven off.

The second part of my invention relates to the use of pyroxyline, or compounds of the same, in combination with this my rubber compound, for the purpose of producing a substance or manufacture possessing properties suitable for forming into hard and inflexible or hard and flexible sheets that may be wrought like ivory, or that by molding or otherwise may be made in a great variety of articles used in the arts, such as are made from ivory, horn, whalebone or vulcanite, or which may be made into a lacquer, a varnish, or a water-proof material. To produce this second compound I take, say, twenty pounds of India-rubber compound and from twenty to thirty pounds of pyroxyline, moistened with some solvent of the same—by preference naphtha. These proportions may be considerably varied. This mixture I grind or masticate with steam-heated rollers until the mass is thoroughly combined, as dough or paste, when it may be used in a plastic or liquid state.

For a transparent or colorless substance I take thoroughly-cleansed and purified India rubber, gutta-percha, or other vulcanizable gums, either separate or combined, and amber and drying-oil, either or both, and after the materials are well blended by fusion or otherwise I bleach the substance in chloride of calcium or soda, in alcohol, or by exhaustion in water or hydrochloric acid, and treating the residue with boiling ether. This substance may be used alone or with gums and resins that will set transparent with it. This will be applicable as a dental rubber and for other uses where a pure and fine substance is required, as a hard and brilliant enamel or japan, and for leather and water-proofing; and, combined or not with pyroxyline, as a lacquer, a paint, or a varnish, when brilliant and delicate colors are required. This will also be applicable to silks and other fabrics and for water-proofing, as it will not impair the beauty or injure the color of the most delicate fabric. I also combine this material, alone or with pyroxyline, with asbestus or other suitable material, and, with suitable coloring matter, for cement for teeth and other purposes for which it may be suited. I also use this substance, combined with suitable coloring matter and combined, or not, with fiber, paper-pulp, or pyroxyline, as an enamel for clothes-lines and cordage, and as an enamel for dental-plates.

For a material suitable for forming insulating-supports in electrical apparatus, and for coating telegraph-wires and cables, I believe this substance will be found vastly superior to any substance before known. For this purpose I prefer using India rubber, gutta-percha, or other vulcanizable gums, either separate or combined, in the proportion of ten pounds of gum or gums to two pounds of amber and about one pound of the oil. This may be applied, in the usual way of covering wire with gutta-percha, by passing the wire through a closed vessel containing the material, or it may be applied in solution as a varnish and hardened, or not, by heat, and may be used alone or combined with pyroxyline or other non-conducting substance.

A very good preparation for covering electrical wire or insulators may be made by taking about equal parts, by weight, of my rubber compound and pyroxyline and coating the wire in any convenient way, and then apply on the top of this another coat containing a large proportion of fiber or paper-pulp, and then another coat the same as the first, and so on until the necessary thickness is obtained. A good insulating substance may also be made by combining this rubber compound with paraffine and wax, either or both combined. Wood or other insulators may be covered by dipping or otherwise in this substance, and baked at a heat of 200° to 300° Fahrenheit. This substance may be used for other purposes for which it may be suited, as a water-proof for wood, fabrics, and other substances.

Suitable colors and bronzes may be used with this material, and the material may be combined with plumbago and other suitable conducting material, and gilded or otherwise ornamented. Hard and elastic sheets may be produced by spreading this material on paper or canvas and pressing between heated rollers or in dies, which may be used as insulating-sheaths for electric wire, or as a covering for corsets or other springs. These sheets may be made single, or two or more cemented and pressed together, and molded or pressed into articles of utility.

What I claim as my invention is—

1. The combining of caoutchouc or other vulcanizable gums and amber or linseed or other drying-oil, either or both combined, for the purpose of converting these substances into hard and inflexible or hard and flexible materials, known as hard rubber or vulcanite, or for converting the same into japans, lacquers, and varnishes, when the same is subjected, or not, to a high degree of heat, substantially as specified; and this whether the said compound of caoutchouc, amber, and oil be or be not mixed with the other ingredients, as set forth.

2. Combining this substance with pyroxyline, for the purpose of producing a substance or manufacture possessing the qualities or properties substantially such as described, when the same is subjected or not to heat, as set forth.

3. The new manufacture or substance hereinabove described, and possessing the substantial properties herein described, and composed of caoutchouc or other vulcanizable gums and amber and drying-oil, either or both combined, in the proportions substantially such as described, and when incorporated, subjected or not to a high degree of heat, as set forth; and this I claim whether combined or not with pyroxyline.

PERRY FINLEY.

Witnesses:
 EDM. F. BROWN,
 JAMES S. GRINNELL.